United States Patent [19]
Gilbreath et al.

[11] Patent Number: 4,987,607
[45] Date of Patent: Jan. 22, 1991

[54] EFFICIENT DYNAMIC PHASEFRONT MODULATION SYSTEM FOR FREE-SPACE OPTICAL COMMUNICATIONS

[75] Inventors: G. Charmaine Gilbreath, Accokeek; Frederic M. Davidson, Cockeysville, both of Md.

[73] Assignee: The United States of America as represented by the Secretary of the Navy, Washington, D.C.

[21] Appl. No.: 242,678

[22] Filed: Sep. 9, 1988

[51] Int. Cl.$^5$ .................................. H04B 10/04
[52] U.S. Cl. ............................. 455/618; 250/214 C; 372/33; 455/600
[58] Field of Search ............... 455/600, 606, 607, 612, 455/609, 610, 611, 613, 617, 618, 619; 350/3.81, 358, 405; 372/30-33; 250/214 AG, 214 C

[56] References Cited
U.S. PATENT DOCUMENTS

| | | | |
|---|---|---|---|
| 4,561,119 | 12/1985 | Epworth | 455/609 |
| 4,752,120 | 6/1988 | Shimizu | 455/616 |
| 4,768,852 | 9/1988 | Ih | 455/609 |

OTHER PUBLICATIONS

Gilbreath et al., "Design Considerations Using Two-Wave Mixing Properties of Photorefractive Materials", Printed in Nonlinear Optical Properties of Materials 1988 Technical Digest Series, vol. 9, dated Aug. 22–25, 1988, Troy, NY, pp. 124–127.
Swanson et al., "Aperture Filling of Phase-Locked Laser Arrays", printed in Optics Letters, Apr., 1987, vol. 12, No. 4, pp. 245–247.
Kukhtarev et al., "Holographic Storage in Electrooptic Crystals. I Steady State" printed in Ferrolectrics, 1979, vol. 22, pp. 949–960.
Kukhtarev et al., "Holographic Storage in Electrooptic Crystals. II. Beam Coupling-Light Amplification, printed in Ferroelectrics", 1979, vol. 22, pp. 961–964.
Hardy "Active Optics: A New Technology for the Control of Light", printed in Proceedings of the IEEE, vol. 66, No. 6, Jun. 1978, pp. 651–697.
Optical Matrix–Matrix Multiplier Based on Outer Product Decomposition, A. Athale and C. Collins, *Applied Optics,* Jun. 15, 1982.
Optical Singular Value Decomposition for the Ax=b Problem, J. Gruninger and H. Caulfield, *IEEE Int. Comm. Optics,* 178 (1983).
Outer Product Expansions and Their Uses in Digital Image Processing.
H. Andrews and C. Patterson, *IEEE Transactions on Computers,* vol. C-25 (1976) Singular Value Decomposition Using Iterative Optical Processors, Vijaya Kumar, *Applied Optics, Apr. 1, 1983.*

Primary Examiner—Joseph A. Orsino
Assistant Examiner—L. Van Beek
Attorney, Agent, or Firm—Thomas E. McDonnell; Peter T. Rutkowski

[57] ABSTRACT

An optical communications system is disclosed for correcting in real-time the wavefront distortions of a beam from a coherent optical transmitting source. The system includes a collimating lens and beam splitter for receiving a distorted wavefront signal beam and splitting the beam into a pump beam and a weaker intensity signal beam. The system includes a detector and computer for measuring the beam distortion and specifying a compensatory wavefront. The weaker intensity signal beam is modified in a 2-D spatial light modulator according to a compensatory wavefront. A photo-refractive material is used to couple energy from the pump beam to the compensated wavefront signal beam thereby producing a corrected and intensity-enhanced communications beam.

5 Claims, 7 Drawing Sheets

FIG.9A  ELECTRO-OPTIC MEDIUM

FIG. 9B

LIGHT INTENSITY

ELECTRIC FIELD AND INDEX OF REFRACTION VARIATION

FIG. 10

EFFICIENT DYNAMIC PHASEFRONT MODULATION SYSTEM FOR FREE-SPACE OPTICAL COMMUNICATIONS

BACKGROUND OF THE INVENTION

Field of the Invention

This invention relates generally to an optical communications system and more particularly to an optical communications system for modulating in real-time the wavefront of a beam from a coherent optical source.

Background Description

In optical communications, there are applications where the wavefront of a beam may change as a function of time. Laser diodes and laser diode arrays (LDA's), which are uniquely suited to satellite communications due to their low mass and compactness, are known to degrade with age, suffering changes in frequency and beamfront characteristics. Propagation through the atmosphere induces changes in the wavefront due to changes in the index of refraction as a function of time. In these cases and others, the optical solutions employed to correct and direct a given beam would suffer degradation in effectiveness over time. Active or adaptive optical systems employ real-time control over optical wavefronts to optimize overall system performance in the presence of time-dependent changes in the beamfront. For applications where maintaining wavefront fidelity throughout a given optical link is required to retain high signal-to-noise ratios, beamfront fidelity or good image reconstruction capability, incorporation of such techniques into the overall system design is highly desirable. Specifically, for the application to spacecraft laser communications, real-time, or dynamic, holography can provide a low mass, compact solution with potentially high resolution for real-time beamfront correction.

Wavefront Aberration Function: In detecting and analyzing changes in wavefronts, the commonly used figure of merit is the Strehl ratio. The Strehl ratio describes the ratio of peak intensity of an image to that of an unaberrated wavefront, and is defined as:

$$i(P) \overset{\Delta}{=} \frac{I(P)}{I} = \frac{1}{\pi^2} \left| \int_0^1 \int_0^{2\pi} \exp(ik\phi) p \, dp \, d\theta \right|^2 \quad (1)$$

where I(P) refers to intensity at point P defined as:

$$I(P) = \left[ \frac{Aa^2}{\lambda R^2} \right]^2 \left| \int_0^1 \int_0^{2\pi} \exp(ik\phi) p \, dp \, d\theta \right|^2 \quad (2)$$

Figure 1A:
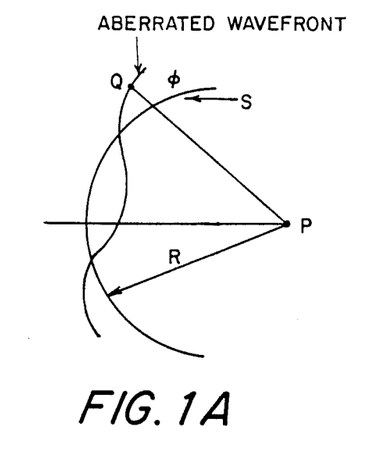
FIGS. 1A and 1B illustrate an imaging system model.
Figure 1B:
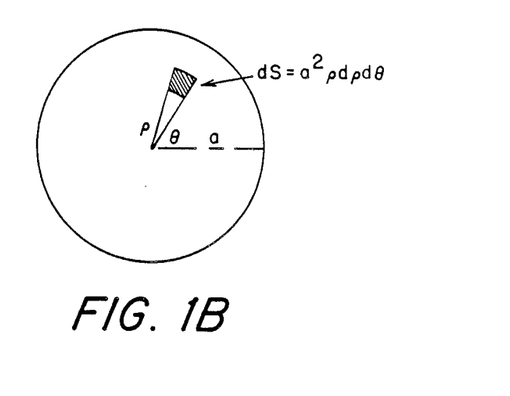

I is the intensity of the unaberrated system which is assumed to be a perfect wavefront, i.e. a sphere of constant amplitude:

$$I = \pi^2 \left[ \frac{Aa^2}{\lambda R^2} \right]^2 \quad (3)$$

where A is the amplitude and R is the radius of the reference sphere, $\lambda$ is the wavelength and $\phi$ is the aberration function with respect to the spherical wavefronts. FIG. 1A illustrates the model of the imaging system. For small aberrations, the wavefront quality can be specified in terms of variance from this reference spherical wavefront. The wavefront aberration function at point Q is the difference in the aberrated wavefront with respect to the ideal spherical reference circle, S. The resulting disturbance at image point, P, is obtained by integrating all elements of $d\phi$ over ds as illustrated in FIG. 1B. It can be demonstrated that small rms errors will result in significant degradation in peak intensity from the ideal as disclosed in *Prin. of Optics*, 2nd Ed., Pergamon Press, 1965 (460–462) by M. Born and E. Wolf. Hence, the signal-to-noise ratios and more importantly, the bit error rate (BER), which is critical to an optical communications link, is strongly affected. Large aberrations result in degradation of the image structure. Hence, recovery of beam fidelity both to retain high signal-to-noise ratios, low bit error rates, and wavefront quality motivates the development of effective methods to compensate in real-time distortions which degrade overall system performance.

Figure 2:
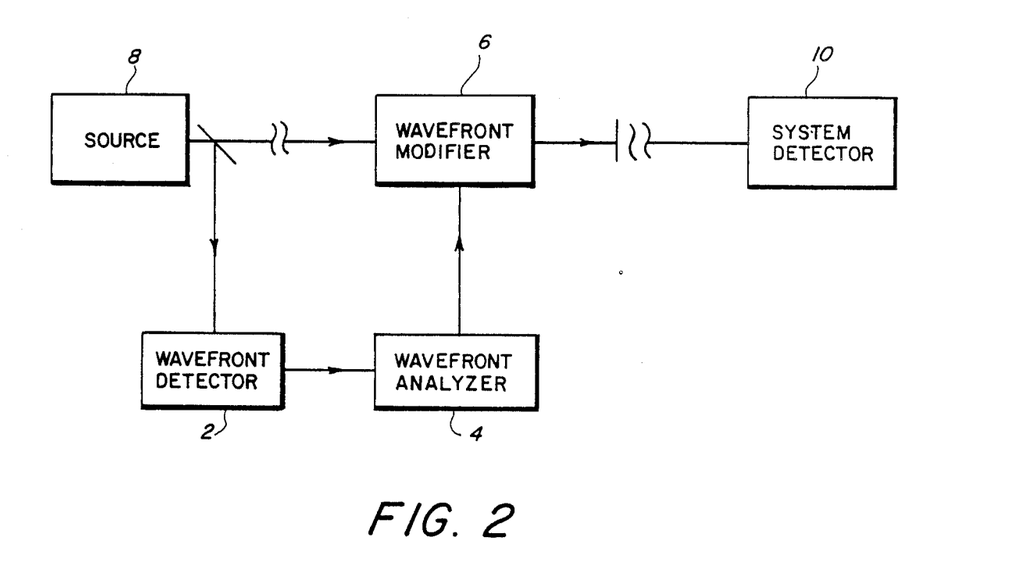
FIG. 2 is a block diagram of a basic optical system to detect, analyze, and modify a wavefront to compensate for changes in transmitter beamfront characteristics and/or changes due to propagation through a time varying medium.

System Considerations: FIG. 2 is a block diagram illustrating the basic components of a system to detect and compensate for beamfront distortion which may be induced from the transmitter and/or channel effects. The fundamental elements of an active or adaptive optical system which can correct the wavefront of the beam must include a means to detect and measure the changes in the beam wavefront 2, a means to analyze and specify a compensatory wavefront, and hardware 6 to modify the distorted wavefront in a specified way. These elements are common to both active optics, which has come to be used to describe open-loop control of wavefront correction, and adaptive optics, which has come to refer to more complex wavefront correction which usually operates in a closed-loop mode. A system detector 10 receives a corrected wavefront beam.

Figure 3:
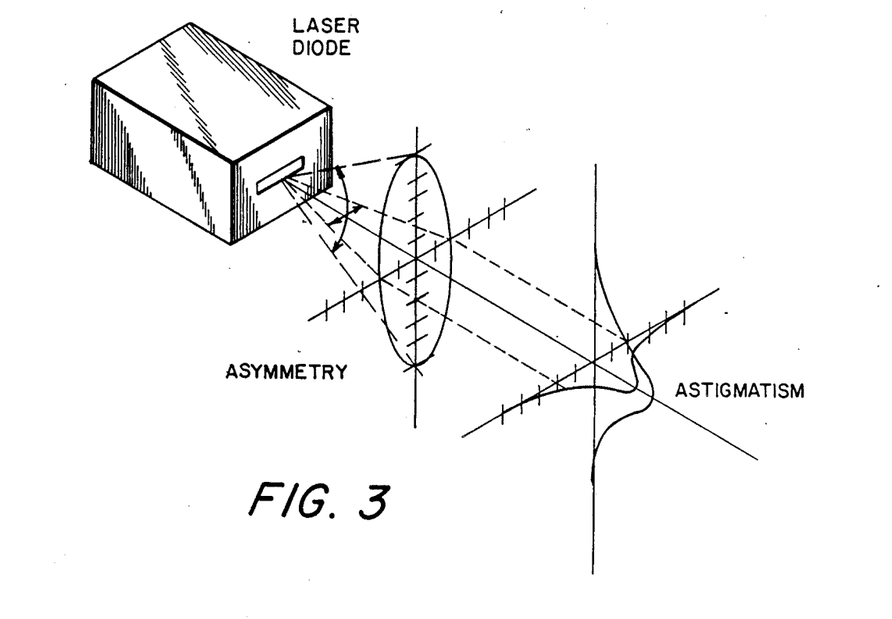
FIG. 3 is an illustration of a typical output from a laser diode.
Figure 4A:
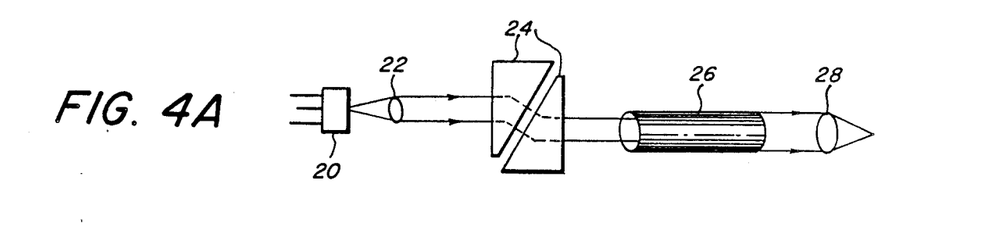
FIGS. 4A and 4B are illustrations of the correction of a laser diode output using conventional optics and the implementation of a holographic solution to reproduce a communications beam respectively.
Figure 4B:
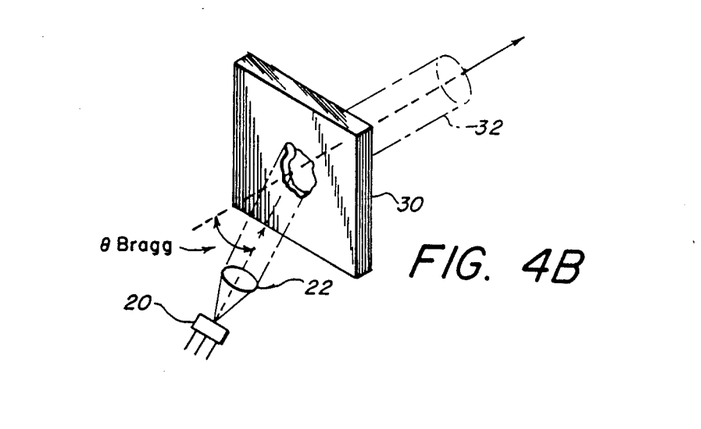

Laser diodes and diode arrays are uniquely suited to spacecraft communications due to their low mass and compact size. These types of optical transmitters, however, suffer beamfront aberrations characterized typically by astigmatism and ellipticity as well as wide divergence. A typical laser output is shown in FIG. 3. Configurations which use conventional optical components to correct and direct the beam are massive and bulky and provide approximate solutions for a specific communications beam. Holograms, due to their unique characteristic of incorporating the functions of multiple optical elements into a single interference pattern which can reconstruct both recorded amplitude and phase information, offer a compelling alternative as disclosed in an article in *Applied Optics*. 24, 2150(1985) by W. H. Carter and H. J. Caulfield. Ideally, one would illuminate a hologram made to correct and direct the output from a specific diode transmitter with the uncorrected beam and the corrected "communications" beam would be diffracted from the hologram at the Bragg angle. FIG. 4A compares the conventional optical solution with the holographic approach in FIG. 4B. In FIG. 4A, a laser 20 transmits an optical signal which passes through a collimating lens 22, through an anamorphic prism pair 24, and through correcting optics 26 to give the desired wavefront before reaching receiving optics 28. In FIG. 4B, the laser 20 transmits an optical signal 20 which passes through a partially collimating lens 22, and through a hologram 30 to give the desired resultant wavefront beam.

As previously discussed, changes in output beam propagation characteristics due either to transmitter degradation over time or distortions induced by disturbances in the optical path motivate a solution wherein modulation of the wavefront to compensate for these distortions is accomplished "in situ" in real-time.

In spacecraft communications, high resolution, device durability, erasability, low power consumption, compactness, relatively low mass and maximized diffraction efficiency are critical design criteria which are influenced by both the functional setting (i.e. the unique requirements of satellite-to-satellite communications) and by the characteristics of the optical transmitter selected.

Figure 5:
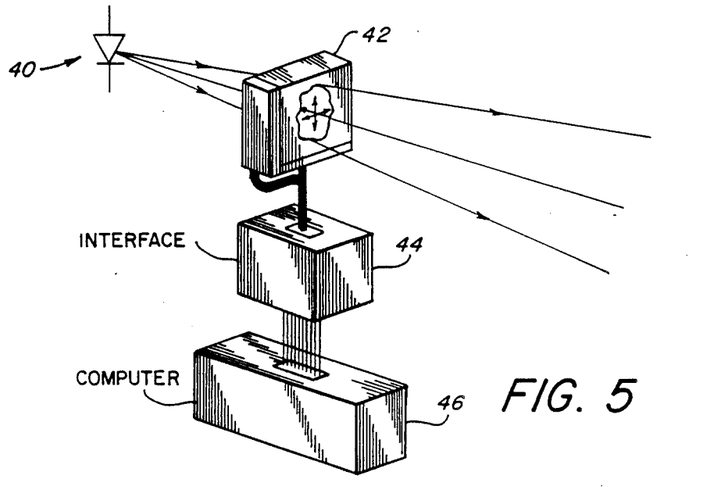
FIG. 5 is an illustration of a direct approach to computing a compensatory wavefront to be induced in a 2-D spatial light modulator.

The most straightforward approach to beam wavefront correction consists of a technique to directly modulate a distorted wavefront signal beam in a given medium by converting the digital signals resulting from analysis into a specific modulation using a two-dimensional spatial light modulator (2-D SLM). The modulated material must be able to respond to light radiating in the near-infrared with high efficiency. FIG. 5 illustrates this strategy. As shown, the coherent optical transmitter 40, characterized as a diode or diode array, illuminates a 2-D SLM 42 which can be modified in place in real-time by electrical distributions derived from a computer 46 analysis of the beamfront aberrations through an interface 44.

Detection of wavefront aberrations and feedback strategies are not addressed here. However, a number of designs ar under investigation, e.g. J. W. Hardy, in IEEE Proc., 66, 651, (1978, presents an excellent introductory review of techniques. Also, the interference phase loop (IPL) developed by Fisher and Warde in opt. Lett., 4, 131 (1979), is a comparatively direct approach which can be adapted to a number of system configurations which employ SLM's.

Assuming variations in a given phasefront have been detected and the information transmitted to a wavefront analyzer, wavefront analysis must be conducted to characterize the distortion and then predict the compensatory grating which must be induced in hardware. In order to reduce payload, should an onboard processing design be elected, and/or to meet response time constraints, it is clear that a reduced number of computational steps which can be accomplished through advanced signal and parallel processing techniques is desirable. The methodology to be employed, however, will be, in part, determined by the type of hardware implementation selected.

Techniques to directly induce phase modulation such as on a monolithic device using the electro-optic (E-O) or magneto-optic effect, are attractive technologies which enable translation of wavefront analysis into hardware implementation. However the lack of commercially available SLM's which can provide high resolution, dynamic range, fast response time, high diffraction efficiency and are robust, modular, and have low power consumption prevent implementation of the direct approach. It is desirable, then, to relax the operational parameters which would make available a wider class of SLM strategies and devices.

SUMMARY OF THE INVENTION

Accordingly, it is an object of the this invention to retain wavefront fidelity throughout a given optical communications link to retain high signal-to-noise ratios, thus low bit error rates, beamfront fidelity and good image reconstruction capability.

It is another object of the present invention to compensate for distortion which may be induced from a transmitter and/or channel effects.

It is another object of the present invention to overcome the inefficiencies of current spatial light modulators.

In one aspect of the present invention this is accomplished by providing an optical communications system for correcting in real-time the wavefront distortion of a beam from a laser diode which includes a lensing means for partially collimating light from the laser diode and a beam splitter for splitting the partially collimated light into a pump beam and a distorted wavefront signal beam. The optical communications system further includes a means for measuring and detecting the distortions in said distorted wavefront signal beam and a means for analyzing and specifying a compensatory wavefront. In addition the system includes a means for modifying the distorted wavefront, a means for directing said pump beam towards an amplifying means wherein light from said pump beam and a compensated wavefront beam from said modifying means are coupled and the compensated wavefront beam is amplified.

The foregoing and other aspects will become apparent from the following detailed description of the invention when considered in conjunction with the accompanying drawings. It is to be expressly understood, however, that the drawings are not intended as a definition of the invention but is for the purpose of illustration only.

DESCRIPTION OF THE PREFERRED EMBODIMENT

A configuration is proposed whereby a distorted wavefront signal beam is transmitted through a selected 2-D SLM and is amplified optically so as to increase power in a "communications" beam. The induced modulation in the 2-D SLM can either be a phase or absorption modulation, or a mix of the two.

Figure 6:
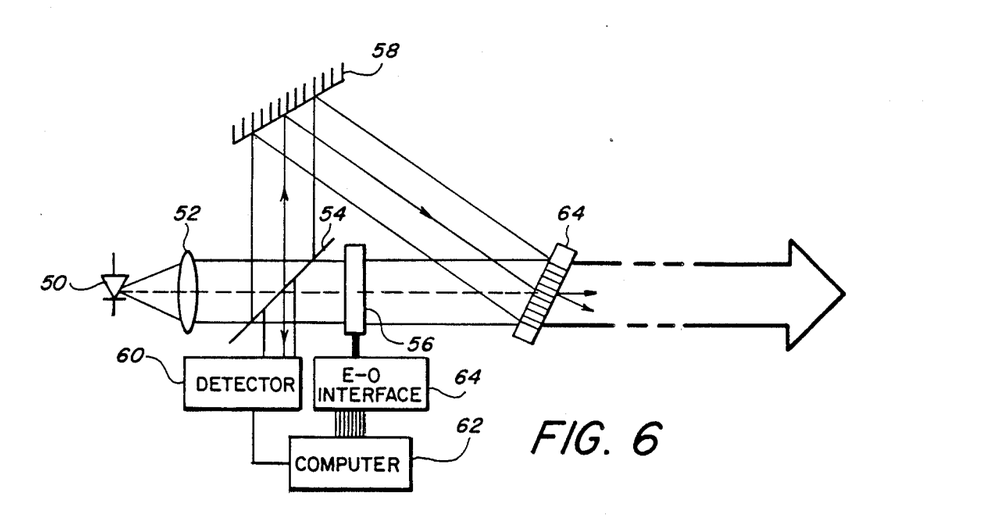
FIG. 6 is an illustration of the preferred embodiment of the present invention for compensating for a distorted wavefront signal beam from a coherent optical source such as a laser diode or a laser diode array.

There are a number of schemes which could amplify the optical signal. These methods, however, do not meet the design criteria for satellite communications. Systems with high resolution, have low diffraction efficiency. Systems which are optically efficient draw too much power from overall satellite systems for realtime operation. A simpler, more direct strategy for this application is to form a real-time hologram in a diffusion-driven photorefractive material. Photorefractive crystals have demonstrated an inherent "gain" mechanism whereby the energy from a "pump" beam can be redistributed into a "signal" beam given the proper angle of incidence between the two beams with respect to the crystal structure as described in *Ferroelec.*, 22, 961 (1979) by N. V. Kukhtarev, V. B. Markowv, S. G. Odulov, M. S. Soskin, and V. S. Vinetskii. FIG. 6 presents the strategy. A coherent optical source, in the preferred embodiment shown to be a laser diode source 50, emits a distorted wavefront signal beam which passes through a system for partially correcting and collimating that wavefront, such as a collimating lens 52 or a binary optical element which may perform multiple optical functions with a single device, as described in *Aperture Filtering of Phase-locked Laser Array*, Optics Letters, Vol. 12, P. 245, April, (1987), by G. J. Swanson J. R. Leger, and Michael Holz which paper is herein incorporated by reference. The system may alternately be comprised of a holographic optical element which can similarly perform multiple optical functions with a single device. The beam then hits a beam splitter 54 where a portion of the beam passes through the beam splitter 54 toward a 2-D spatial light modulator 56 and the remainder of the beam, called the pump beam is directed toward a mirror 58. The portion of the distorted wavefront signal beam passing through the beam splitter 54 is of a smaller intensity than the pump beam. The lower intensity signal beam passes through a 2-D spatial light modulator 56 which may be any standard 2-D spatial light modulator. A detecting system 60, which may consist of an array of photo-sensitive detectors, such as a CID or CCD device, detects the distorted wavefront signal beam and sends this signal to a computer 62 where the distorted wavefront signal beam is analyzed and a compensatory wavefront is specified in a known manner. The computer 62 is interfaced to the 2-D spatial light modulator through an electro-optic interface 63. The 2-D spatial light modulator 56 then modifies the distorted wavefront signal beam according to the specified compensatory wavefront to produce at its output a compensated wavefront signal beam. FIG. 6 illustrates an SLM which modulates the incident light directly However, the 2-D SLM may also comprise a holographic interference pattern whereby the corrected signal beam is diffracted from it. The pump beam is directed by a mirror 58 toward an energy coupling means, such as a photorefractive device 64 where the pump beam is coupled to the compensated wavefront signal beam. The photorefractive device acts to couple the two beams and produce at its output a corrected and intensity-enhanced communications beam. The actual rates of pump to signal beam intensities involves balancing of design criteria enabling both diffraction efficiency and gain. Fresnel reflectance, selfpumping and absorption also must be taken into account in the design.

For more details on this design the paper entitled *Design Considerations Using Two-wave Mixing Properties of Photorefractive Materials*, O.S.A. Technical Digest, Vol. 9, P. 124 (1988) by G. C. Gilbreath and F. M. Davidson is substantially incorporated herein as follows.

Holographic recording in photorefractive materials is the subject of continued interest in the areas of image enhancement real-time spatial light modulation and amplification. One of the properties of photorefractive media where energy can be transferred from a strong "pump" beam into a weaker "signal" beam has come to be known as "two-wave mixing". This property holds promise as a means for providing effective energy coupling for systems where efficient use of a fixed light budget is an over-riding design requirement, such as in a spacecraft laser communications link.

When efficient use of a system's overall energy budget is driving design consideration, diffraction efficiency as well as amplification of the signal is important. The present parameter for diffraction efficiency, $\eta$, is defined with respect to photorefractive media using assumptions and definitions borne from static holography. The resulting relationships can lead to misleading interpretations, and finally erroneous designs when system efficiency is important. Presented hereinafter, is a mew figure-of-merit for steady-state two-wave mixing diffraction efficiency, $\eta_2-\lambda^a$, which includes total incident energy, the relationships between exponential gain, beam coupling, beam ratios, and the effects of absorption losses.

Design relationships are discussed for those conditions which enable amplification without sacrificing diffraction efficiency. The effects of Fresnel reflectance self-pumping, and absorption are discussed in terms of overall system efficiency.

Diffraction efficiency has been defined as the ratio of the intensity of a diffracted beam to that of an incident reading beam whereby the reading beam is a signal beam, independent of the two mutually coherent writing beams used to form the grating in the photorefractive material. This definition provides a measure of the fidelity of the holographic grating which does not change the gratings' characteristics. However, a direct figure-of-merit is not provided which quantifies efficient energy transfer with respect to the total energy usable in the system. To make a realistic assessment of power considerations, such a figure-of-merit is necessary in the case where the reading and writing beams are the same and where effective use of total energy in a system is important.

To that end, we define steady-state two-wave mixing photorefractive diffraction efficiency, $\eta_2-\lambda$, to be the ratio of light diffracted into the signal beam to the incident light which consists of both the pump beam and signal beam. Using the notation of Kukhartev:

$$\eta_2-\lambda = \frac{I_{-1}}{I_{+10} + I_{-10}} \quad (1)$$

where $I_{+10}$ and $I_{-10}$ are incident pump and signal beam intensities at y=0, respectively. $I_{-1}$ and $I_{+1}$ are intensities in the signal and pump beams and are defined by Eqns. (2) and (3) respectively:

$$I_{-1} = \frac{I_{+10} + I_{-10}}{1 + m\exp(-\Gamma L_{eff})} \quad (2)$$

$$I_{+1} = \frac{I_{+10} + I_{-10}}{1 + m^{-1}\exp(\Gamma L_{eff})} \quad (3)$$

where $m = I_{+10}/I_{-10}$. When Eqn. (1) is combined with Eqn.(2), the two-wave diffraction efficiency becomes:

$$\eta_{2-\lambda} = \frac{1}{1 + m\exp(-\Gamma L_{eff})} \quad (4)$$

The exponential gain, $\Gamma$, is determined by material parameters.

$L_{eff}$ is the effective length and is dependent upon the geometry of the crystal with respect to the incident beams and c-axis. For a parallelpiped geometry such as is the case with BaTiO$_3$, $L_{eff}$ is defined as:

$$L_{eff} = \begin{cases} \frac{a}{\cos\beta} & \beta < \beta' \\ \frac{b}{\sin\beta} & \beta > \beta' \end{cases} \quad (5)$$

where $\beta' = \tan^{-1}(b/a)$.

The product of the exponential gain and effective length, $\Gamma L_{eff}$, is maximized through geometries and material properties.

Spatial and/or temporal amplification of the signal beam has been expressed in terms of gain, G. This parameter is defined as the signal intensity in the presence of the pump divided by the signal intensity with no pump present, i.e. $I_{-1(pump)}/I_{-1(no\ pump)}$. This relation can be expressed in terms of the beam ratio, the exponential gain and effective length as:

$$G = \frac{(1 + m)}{1 + m\exp(-\Gamma L_{eff})} \quad (6)$$

As can be seen from the equation, the greater the pump-to-signal signal ratio, the greater the value of G. However, G gives no information regarding actual energy coupling as it relates to the total energy budget, hence to the diffraction efficiency.

Specific material parameters necessary to compute optimum coupling geometries for a given material are not generally available except through reference values. It is possible to find this geometry iteratively, however and measures values for this product directly.

$\Gamma L_{eff}$ can be expressed as:

$$\Gamma L_{eff} = \ln\left(\frac{I_{-1}}{I_{+1}} \frac{I_{+10}}{I_{-10}}\right) \quad (7)$$

Each of the intensities in the above expression are directly measurable and $L_{eff}$ can be computed from the dimensions and properties of the material.

A coupling coefficient, $\gamma_c$, can be defined which quantifies the transfer of energy from the pump into the signal beam as $\gamma_c = I_{-1}/I_{+1}$. From Eqn. 7. $\gamma_c = \exp(-\Gamma L_{eff}/m)$. Whereas the gain increases with the pump-to-signal ratio, m, the coupling decreases. For geometries in which energy transfer is to occur from pump to signal, maximum energy transfer for a fixed $\Gamma L_{eff}$ will occur when m=1. However, beam coupling characteristics are typically most useful for amplification applications when m is large.

Since energy coupling decreases with increasing m in all cases, clearly there are values for he pump-to-signal ratio where $\gamma_c$ is small even for larger values of $\Gamma L_{eff}$. Hence, conditions for large G are not necessarily conditions conducive to strong energy coupling. Present workers interested in amplification choose ratios on the order of $10^3$–$10^5$. Values for $\Gamma L_{eff}$ tend to range from less than 1 to about 6. For such values although G is significant, $\gamma_c$ is small. For larger values of $\Gamma L_{eff}$ a wider range of values of m can be tolerated before coupling decreases significantly.

The sensitivity of $\eta_{2-\lambda}$ to $\gamma_c$ can be expresses as:

$$\eta_{2-\lambda} = \frac{1}{1 + (1/\gamma_c)} \quad (8)$$

Values of $\eta_{2-\lambda}$ remain greater than 90% when $\gamma_c$ is as low as 10. This relative lack of sensitivity enables applications where larger values of m are desirable as well as diffraction efficiency. However, materials or geometries available which preclude achieving higher values of $\Gamma L_{eff}$ dictate careful choice of m to achieve a reasonable trade-off between these two parameters.

The photorefractive effect occurs in anisotropic materials where the polarization of incident light significantly influences the magnitude of the effects. Consequently, from a perspective of system efficiency, it is important to consider the incident angles not only in terms of $\theta_B$ and $\beta$, but in terms of angles which reduce reflection and enhance transmission. Reflection and transmission characteristics of polarized light incident on a given material of index of refraction, n, are well-known phenomena. Direct measurements of the normalized reflection and transmission coefficients enable the experimenter to measure $n_{ext}$ and $n_{ord}$ for the selected material. The Brewster angle, at which reflection is nuled for P-polarized light and minimized for S-polarized light can be found through calculation or if geometry will permit, measurement.

Considering the Fresnel phenomena in combination with geometric requirements to achieve large values for $\Gamma L_{eff}$ it appears that large angles of incidence which enhance photorefractive coupling also reduce reflection However, transmittance is not necessarily enhanced due to the known phenomenon of self-pumping. Self-pumping in this context is a parasitic process whereby energy transfers from pump to signal but then from signal to the singal's competing conjugate The conjugate forms to a greater or lesser extent depending on intensity, polarization and geometry. Thus, over time, the signal beam does not enjoy the effect of a complete energy transfer from the pump.

In materials with large electro-optic (E-O) coefficients which enable significant energy coupling, such as BaTiO$_3$, the phenomena is aggravated by geometries which cause the formation of reflection gratings and other effects. For configurations which improve beam coupling and reduce reflections, conditions for self-pumping are also enhanced. The design trade-off then becomes one of finding $\theta_B$ and $\beta$ such than $\theta_{i(sig)}$ and $\theta_{i(pump)}$ cause reduced reflection without significantly affecting transmission.

To include the effects of absorption, the intensities, $I_{+1}$ and $I_{-1}$, are corrected when defined as $I^a{}_{+1} = I_{+1}\exp(-aL_{eff})$.

Now the figure-of-merit for two-wave mixing diffraction efficiency becomes:

$$\eta_{2-\lambda} = \frac{1}{\exp(\alpha L_{eff}) + m\exp[(\alpha - \Gamma)L_{eff}]} \quad (9)$$

Clearly, absorption can have a dominant impact on overall system or device efficiencies.

Experimental data was taken using BaTiO$_3$ using an Ar$^+$ laser, $\lambda = 514.5$ nm. total intensities were on the order of 5–23 mW. Light was polarized parallel to the plane of incidence except in the case where reflection and transmission coefficients were measured. The c-axis was parallel to a rectangular face.

Values for $n_{ext}$ and $n_{ord}$ were found to be 2.45 and 2.46 respectively. The Brewster's angle was computed to be 67.8 degrees for these values as direct measurement was not possible due to geometry. These measurements compare to referenced values of $n_{ext} = 2.421$ and $n_{ord} = 2.488$, $\theta_{Brew} = 67.6$ degrees. The absorption for this crystal was found to be 0.102 per mm.

The crystal was oriented for a $\Gamma L_{eff}$ of 3.90 This value corresponded to a geometry of $\theta_B = 3.66$ degrees in the medium and $\beta = 30$ degrees. Angles of incidence for P-polarized light for this geometry compute to $\theta_{i(sig)} = 39$ degrees and $\theta_{i(pump)} = 21$ degrees.

Experimental points were plotted for $\gamma_c$ vs m and G vs m against analytic curves for $\Gamma L_{eff} = 3.90$. The resulting plot clearly showned that for values of m which enhance amplification, i.e. for large G, he coupling is reduced.

Data points for $\eta_{2-\lambda}$ corrected for the measured value of $\alpha$, reflection and self-pumping were plotted against the theoretical curves above. In comparing these plots, ratios on the order of 5 enable diffraction efficiencies on the order of 90% as well as gain. Self-pumping accounted for about 4% of the energy coupled out of the signal into the conjugate. In this figure, the effects of absorption on overall efficiency were plotted as $\eta_{2-\lambda}$. A figure for absolute efficiency, $\xi$, was also plotted which includes all effects. In comparing these three sets of data points, it was evident that absorption had the most marked effect on overall efficiency. $\eta_{2-\lambda}$ was reduced by over 25% due to absorption losses for this crystal.

It has been shown that conditions which optimize the exponential gain, $\Gamma$, in photorefractive media, do not necessarily ensure large energy coupling. For materials which enable large $\Gamma L_{eff}$ products either through material parameters, or geometries, or both, wider ranges of values of the beam ratio, m, can be tolerated and still result in strong coupling. Since conditions which enhance gain, G, hence, amplification, will not necessarily yield efficient coupling. Careful choice of the beam ratio is necessary when using materials whose photorefractive properties are limited and/or for a choice of geometries which result in small values of $\Gamma L_{eff}$.

A new figure-of-merit has been defined to describe diffraction efficiency for two-wave mixing, $\eta_{2-\lambda}$. This parameter provides a quantitative measure of system or device efficiency in terms of usable diffracted optical power to the total power incident on the material. This parameter is somewhat insensitive to energy coupling in that low values of $\Gamma_c$ can be tolerated and still high values of $\eta_{2-\lambda}$. Hence, with careful choice of m with respect to $\Gamma L_{eff}$, amplification can be achieved and diffraction efficiency not necessarily sacrificed.

Design tradeoffs are discussed in terms of geometries which enhance photorefractive performance, reduce the effects of reflection and enhance transmittance. Due to self-pumping, the Brewster's angle is not necessarily the angle of choice even if it were achievable from the geometry of the material.

Significant losses in optical power due to self-pumping, reflection and absorption combine to yield relatively low overall efficiencies even when conditions are configured to provide highest diffraction efficiencies from the photorefractive mechanism. As has been discussed in the literature, use of an index-matching fluid is one way to reduce the impact of reflection losses. For materials with high E-O coefficients, small angles of incidence for the pump and signal beams can be chosen to reduce the effects of self-pumping. However, for those geometries absorption losses have the most effect on overall efficiency. These losses are a function of the method of manufacture of the material and the choice of the material. Work is being conducted with impurities to enhance the photorefractive properties. However coefficient of doping may result in changes in the absorption coefficient resulting in higher optical densities and finally, less efficient use of a fixed light budget.

Optical signal processing techniques can implement standard digital signal processing and parallel processing methods to reduce the number of steps necessary to compute and build the compensatory modulation. The method or combination of methods will depend on the type of technology selected.

Singular value decomposition (SVD), for example, is well known to be useful for image processing and was demonstrated to be such in the seventies, e.g. See IEEE Trans. Comput. C-25, 140 (1976) by H. C. Andrews and C. L. Patterson. However, this technique imposes a heavy computational burden. It has been suggested by B. V. K. Vijaya Kumar in *Appl Optics*, 22, 962 (1983) that if optical processing can be used to perform SVD, the computation can be carried out at rapid rates. Hence, system response time requirements can be met. Specifically, the suitability of SVD to optical processing to solve the Ax=b problem has been addressed by J. Gruninger and H. J. Caulfield in *IEEE Int. Comm. Optics*, 178 (1983).

An approach which is attractive in terms of implementation using fewer steps is in development by R. A. Athale and W. C. collons in *Appl. Optics*, 21, 2089 (1982). Outer product operators are applied to matrix-matrix multiplications to build a two-dimensional spatial light modulator which can be modified "in situ" in real-time. Their technique offers flexibility and can be implemented with devices using electro-optic modulation or a methodology using a directly-driven LED array or with acousto-optic (AO) strategies. Essentially, this strategy allows an electrical input to optically modulate an SLM without the usual slow 2-D scanning techniques.

PHOTOREFRACTIVE EFFECT AS THE OPTICAL AMPLIFICATION MECHANISM

Two-wave mixing or beam coupling, refers to the phenomenon of energy transfer from one beam to another in the presence of a phase shift of the grating formed in a photorefractive medium by changes in the index of refraction with respect to the irradiance fringe pattern. This phase shift can be induced mechanically, or by placing an electric field across the material, or by using diffusion-driven media which inherently shifts the grating upon recordation of the intensity pattern in the material. Hence, the photorefractive effect enables formation of holograms in real-time which, through beam-coupling, can "amplify" image intensity and time-dependent signals.

Figure 7A:
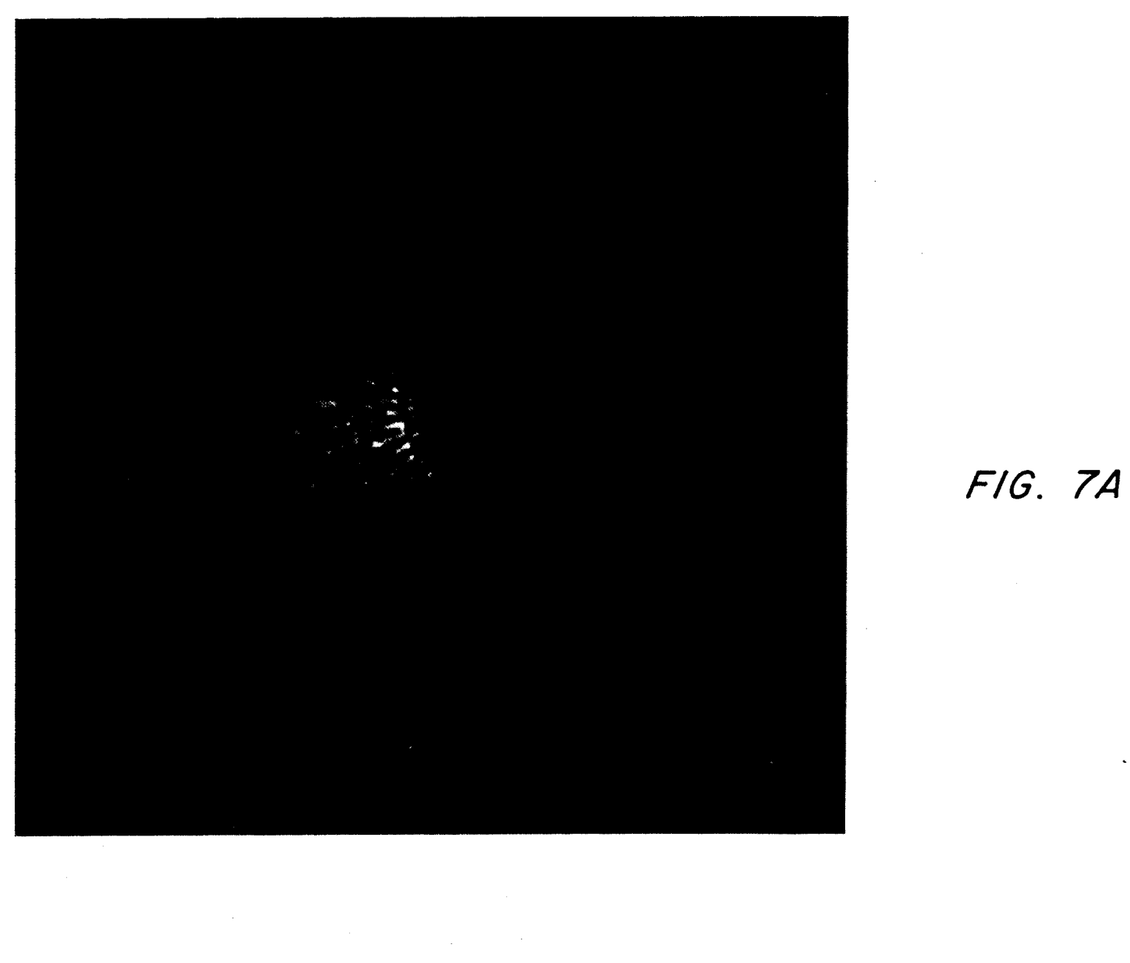
FIGS. 7A and 7B show the image intensity of a beam without photorefractive pump beam coupling and with pump beam coupling respectively.
Figure 7B:
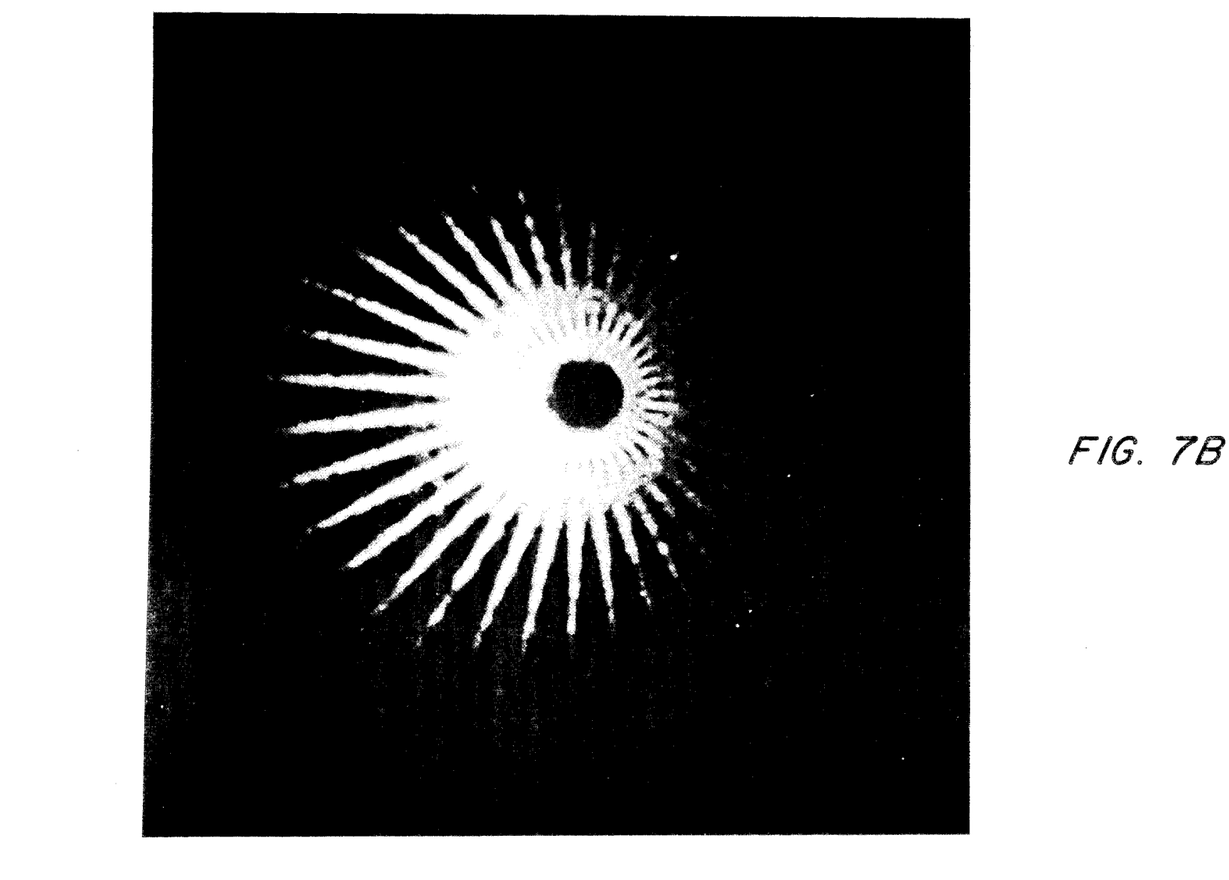
Figure 8:
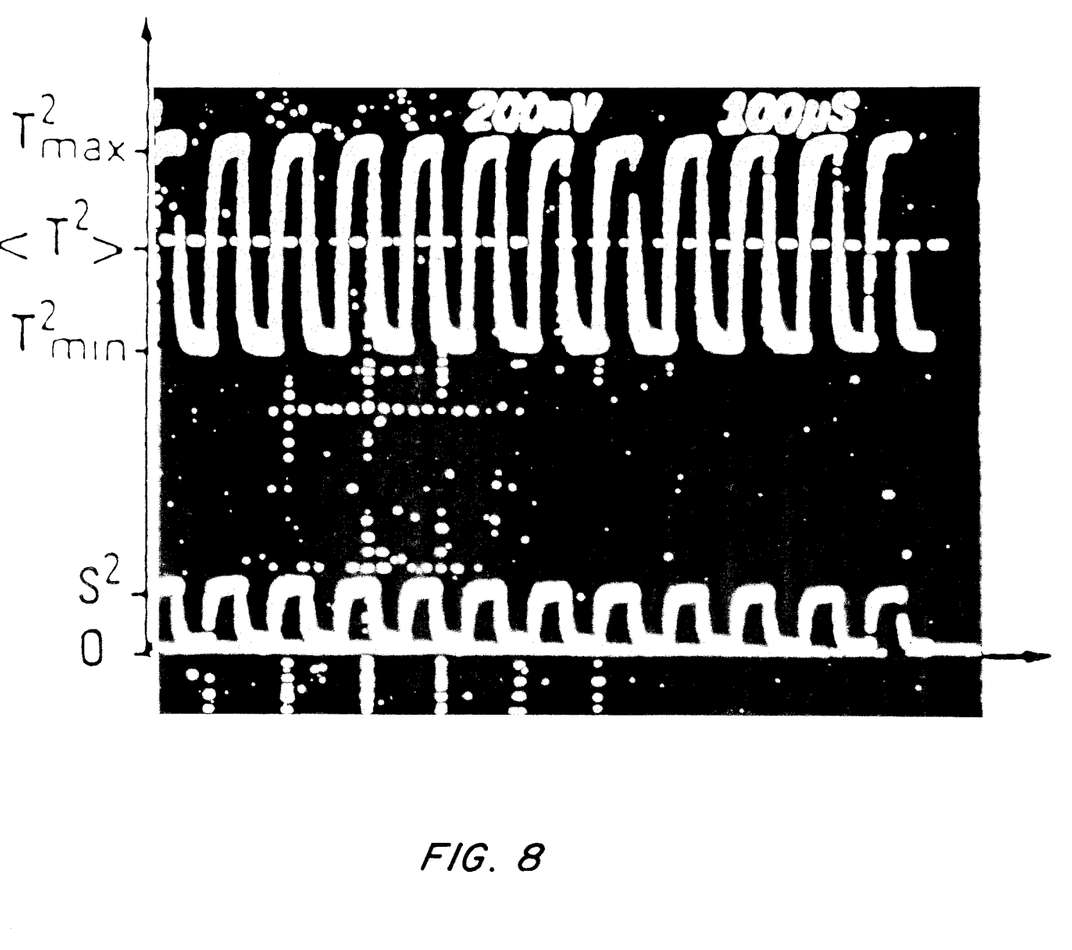
FIG. 8 shows the effect of energy transfer on a time-dependent signal induced by grating formed in $Bi_{12}SiO_{20}$.
Figure 9A:
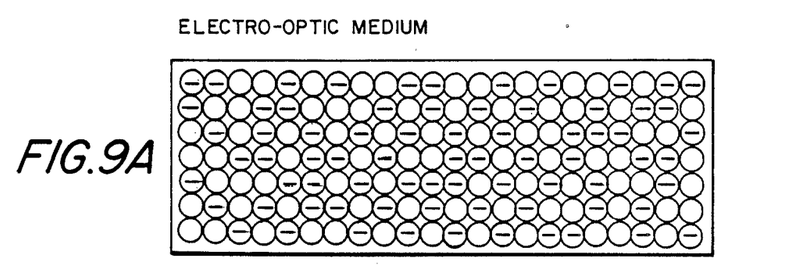
FIGS. 9A and 9B show the photorefractive effect upon an electro-optic medium before and after exposure to light respectively.
Figure 9B:
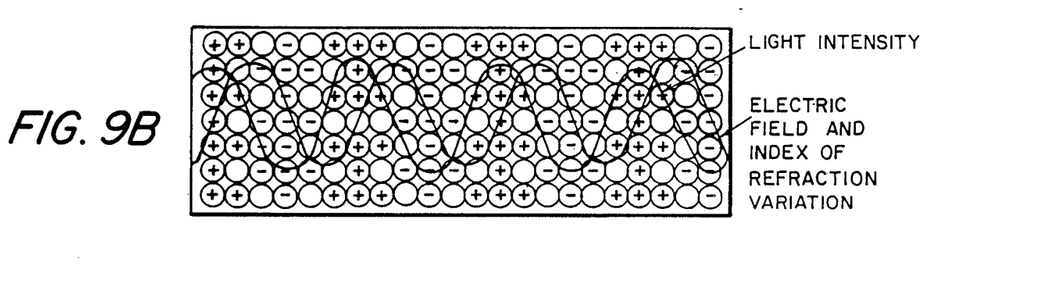

In FIG. 7A is shown the image intensity of a signal beam without pump beam coupling and FIG. 7B shows the amplified image after coupling with a pump beam in a $KNBO_3$ crystalas described by P. Guenter in Physics Reports, 93, 199 (1982). FIG. 8 shows the effect of the pump beam energy transfer on a time dependent signal induced by grating formed in $Bi_{12}SiO_{20}$ as described by G. H. DeMontchenault, B. Louiseaux, and J. P. Huignard in OSA Tech Digest, 17, 77, (1987). The effect is summarized as follows: An interference pattern is incident upon a suitable material. Areas of high intensity excite carriers out of deep level traps into the conduction band, which diffuse or drift into regions of low intensity. A new space-charge field, $E_{SC}$, is formed. The index of refraction is modified by the electro-optic effect and a volume phase hologram is formed. If the formed grating is shifted by ninety degrees with respect to the incident light pattern and the incident beams are situated properly with respect to the electro-optic axis, two-wave mixing occurs FIG. 9A illustrates the trap distribution in an electro-optic medium before exposure to light and FIG. 9B illustrates the charge distribution in an electro-optic medium after exposure to light as more fully described by J. J. Amodei and D. L. Staebler in RCA Review, 33, 75, (1972). Effective intensity amplification of a weak beam is obtained if the gain is larger than the absorption constant of the material As pointed out by P. Guenter in *Physics Reports,* 93, 199 (1982), a detailed knowledge of photorefractive recording mechanisms makes it possible to optimize, hence the gain, with a specific selection of physical parameters such as the applied electric field, fringe spacing, recording wavelength, etc. As discussed in this application, a material which does not require an external field is desirable. The electro-optic tensor component should be high to maximize the effect. One such diffusion-driven photorefractive material with a very high electro-optic coefficient is $BaTiO_3$.

Figure 10:
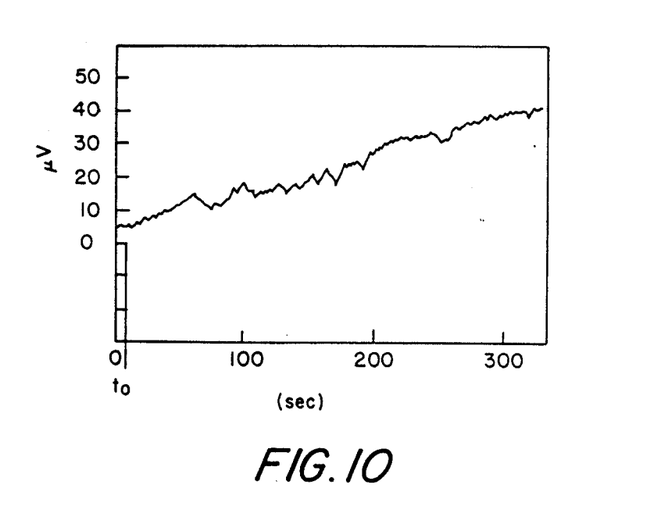
FIG. 10 illustrates the energy transfer observed in $BaTiO_3$ using a mode-stabilized single-mode laser diode at 854 nm.

Considerable research has been done investigating this effect in photorefractive materials such as $BaTiO_3$, $Bi_{12}SiO_{20}h$ (BSO), $KNbO_3$, and $LiNbO_3$. However, their spectral response begins to severely degrade around 600 nm–700 nm. The diode and diode arrays emit in the near-infrared (750 nm–900 nm) and so a photorefractive material exhibiting sensitivity at these wavelengths is also necessary. It has been shown that $BaTiO_3$ responds to a mode-stabilized laser diode radiating at 854 nm and has been used for proof-of-concept. For more details on this approach, a paper by G. C. Gilbreath and F. E. Davidson entitled *High-Resolution Dynamic Holography For Spacecraft Optical Communications,* Proc. of Int'l. Conf. on Dig. Sig. Proc., Florence, Italy, (Sept, 1987) is incorporated by reference herein. Results, as shown in FIG. 10 demonstrate two-wave mixing using a mode-stabilized single-mode laser diode with $BaTiO_3$. A Sharp 30 mW laser diode which was mode-stabilized at 854 nm using active temperature control was selected as the optical transmitter. A grating was formed by allowing the low intensity beam and the high intensity beam to interfere in the crystal. The output from the signal beam grows in intensity coupled from the pump. Response from $BaTiO_3$ with the diode can be optimized with proper beam intensity ratios, angle of incidence and experimental stabilization. As reported by other researchers in the field, e.g., S. H. Wemple, M. Didomenico, and I. Camlibel in *J. Phys. Chem. Solids.* 29, 1797,(1968), writing time is slow in $BaTiO_3$ due to transparency in this frequency range. A material such as optimized GaAs as disclosed by L. J. Cheng in *OSA Tech. Digest,* 17, 128, (1987) may be better suited to operation in the near-infrafed.

A method for correcting aberrations in an optical beamfront induced through changes in the optical transmitter or by channel effects has been presented. The strategy combines signal processing techniques, spatial light modulator technology, principles of holography, and the photorefractive effect to enable beamfront distortions to be corrected in real-time, "in situ". The approach relaxes diffraction efficiency requirements on the SLM by amplifying the beam from the SLM using the inherent energy coupling mechanism of the photorefractive effect under certain conditions. This method allows the system designer to utilize a wider class of computer-controllable dynamically inducable two-dimensional spatial light modulators and techniques. Results are reported which demonstrate energy transfer in $BaTiO_3$ using a mode-stabilized laser diode radiating in the 800 nm region. However, photorefractive materials sensitive at the wavelengths of interest for use as the method of optical amplification are still in the developmental stage and are more suitable as a means of energy coupling when the coherent optical transmitter radiates in the near-infrared region.

Obviously, many other modifications and variations of the present invention are possible in light of the above teachings For example, the above teachings would be applicable to any optical communications system where you have a fixed light budget and you want to use the available light efficiently. It is therefore understood that within the scope of the appended claims, the invention may be practiced otherwise than as specifically described.

What is claimed as new and desired to be secured by Letters Patent of the United States is:

1. An optical communications system for correcting in real-time the wavefront distortions of a signal beam from a coherent optical transmitting source, comprising:
    means for partially collimating said distorted wavefront signal beam from said coherent optical transmitting source;
    means responsive to said partially collimated distorted wavefront signal beam for splitting said partially collimated distorted wavefront signal beam into two beams known as a low intensity signal beam and a pump beam wherein said pump beam is of stronger intensity than said low intensity signal beam;
    means for detecting and measuring said distortions in said distorted wavefront beam;
    means responsive to said detecting and measuring means for analyzing said distortions and specifying a compensatory wavefront;
    means for modifying said low intensity signal beam according to said specified compensatory wavefront to produce a compensated wavefront signal beam;
    means for directing said pump beam towards an energy coupling means; and
    said energy coupling means responsive to said compensated wavefront signal beam for coupling energy from said pump beam to said compensated wavefront signal beam wherein said compensated wavefront signal beam is amplified through transfer of energy from said pump beam thereby producing a corrected and intensity-enhanced communications beam.

2. The optical communications system recited in claim 1 wherein said means for modifying said low intensity signal beam comprises a two-dimensional spatial light modulator.

3. The optical communications system recited in claim 1 wherein said coupling means includes a photorefractive material which is sensitive to a wavelength of said optical transmitting source.

4. A method for correcting in real-time the wavefront distortions of a beam from a coherent optical transmitting source, comprising the steps of:

partially collimating a distorted wavefront signal beam from said coherent optical transmitting source through an optical means;

splitting said partially collimated distorted wavefront signal beam into two beams known as a low intensity signal beam and a pump beam, wherein said pump beam is of a stronger intensity than said low intensity signal beam;

detecting and measuring said distortions in said distorted wavefront signal beam;

analyzing said distortions and specifying a compensatory wavefront;

modifying said low intensity signal beam according to said specified compensatory wavefront thereby producing a compensated wavefront signal beam;

directing said pump beam towards a coupling means; and coupling said pump beam to said compensated wavefront signal beam, wherein said low intensity signal beam is amplified through transfer of energy from said pump beam thereby producing a corrected and intensity-enhanced communications beam.

5. An optical system for correcting wavefront distortions of a coherent optical beam, said system comprising:

means for splitting said coherent optical beam into a first and a second optical beam;

means for identifying said distortions;

means, responsive to said means for identifying, for modifying said second optical beam into a compensating optical beam; and wherein, said means for identifying said means for modifying and said means for coupling cooperate to cause said output optical beam to be substantially without said distortions.

* * * * *